(12) United States Patent
Myers

(10) Patent No.: US 7,536,687 B1
(45) Date of Patent: May 19, 2009

(54) SYSTEM AND METHOD FOR AUTOMATIC INSTALLATION OF EMBEDDED SOFTWARE PACKAGES

(75) Inventor: Brandon Myers, Durham, NC (US)

(73) Assignee: EMC Corporation, Hopkinton, MA (US)

( * ) Notice: Subject to any disclaimer, the term of this patent is extended or adjusted under 35 U.S.C. 154(b) by 911 days.

(21) Appl. No.: 10/874,647

(22) Filed: Jun. 23, 2004

(51) Int. Cl.
*G06F 9/445* (2006.01)
*G06F 9/44* (2006.01)
*G06F 11/00* (2006.01)

(52) U.S. Cl. .................. 717/174; 717/168; 717/176; 714/10; 714/23

(58) Field of Classification Search ............... None
See application file for complete search history.

(56) References Cited

U.S. PATENT DOCUMENTS

| | | | |
|---|---|---|---|
| 5,956,505 A * | 9/1999 | Manduley | 713/1 |
| 6,151,683 A * | 11/2000 | Wookey | 714/2 |
| 6,381,742 B2 | 4/2002 | Forbes et al. | |
| 6,681,390 B2 * | 1/2004 | Fiske | 717/173 |
| 6,966,000 B2 * | 11/2005 | Zhang et al. | 726/22 |
| 7,380,177 B2 * | 5/2008 | Goin et al. | 714/47 |
| 2005/0107898 A1 * | 5/2005 | Gannon et al. | 700/90 |
| 2008/0127171 A1 * | 5/2008 | Tarassov | 717/174 |

OTHER PUBLICATIONS

Sun Microsystems, Inc., "Sun StorEdge Enterprise Backup Software 7.0 Installation Guide", Sun Microsystems, Inc., Mar. 2003, pp. 1-100.*

* cited by examiner

*Primary Examiner*—Eric B Kiss
*Assistant Examiner*—Ben C Wang
(74) *Attorney, Agent, or Firm*—Ward and Smith, P.A.; A. Jose Cortina; R. Kevin Perkins

(57) ABSTRACT

The system and method facilitates transition from one software packaging model to a new model. New software packages include a capability package and an enabler package. The capability package provides new or enhanced functionality, and the enabler package serves to provide information that the user has purchased the particular software involved, and is entitled to use the optional feature that the package delivers. The system and method provides for installation of the new software package on older software packages in a non-disruptive manner.

15 Claims, 6 Drawing Sheets

| NAME | VERSION | STATE |
|---|---|---|
| A | 2.0 | ACTIVE |
| B | 2.3 | ACTIVE |
| A | 1.0 | PRIOR |
| B | 2.2 | PRIOR |

Fig. 3

SYSTEM AND METHOD FOR AUTOMATIC INSTALLATION OF EMBEDDED SOFTWARE PACKAGES

FIELD OF THE INVENTION

The invention relates to a system and method for facilitating transition from one software packaging model to a new model. In the past, the presence of an optional software package, such as an upgrade package, was automatically enabled for use by the users. In accordance with the invention, optional packages are always installed but not enabled unless an enabler package is also installed. The enabler package is embedded within a capability package and is designed to be installed with older software that is not designed to function with the new software packaging model.

BACKGROUND OF THE INVENTION

Storage networks are generally made up of a series of storage arrays, for example, those available commercially from EMC Corporation under the name CLARiiON® and which include storage processors and hard drives within the array. Such arrays typically include two storage processors, functioning to control operation of the hard drives and communications back and forth throughout the network. Such networks typically include one or more hosts in the form of servers i.e., computers, which communicate with the various storage arrays connected throughout the network.

Such storage arrays typically operate under the control of the previously referenced storage processors, typically two storage processors for redundancy purposes as well as for the purpose of taking on different tasks, and in cooperation with software which is loaded on the storage arrays to manage and control the operation thereof. As is well known, technology is constantly evolving and improvements become available over short time periods for storage arrays located on such networks. It is often the case that the improvements come in the form of enhancements to the software over time which can be installed on the storage arrays to improve the performance thereof without requiring replacement of the storage array units themselves, which can typically be a very expensive task.

In the past, the normal installation path for storage arrays such as the aforementioned CLARiiON® systems, for example, the model numbers CX600 or CX400 thereof, involved a fairly standard sequential installation path. In such an installation, all of the software packages are installed and automatically enabled for use.

A typical prior art installation involves querying the new software packages for errors which may have become known after the time an earlier version of the software package was installed. Thereafter the storage package is stored persistently on a portion of an array on which it is being installed. The cache for one of the storage processors is then disabled and certain scripts are run to detect other types of errors. If no errors are found, the software package is installed or copied to the peer storage processor (SP) and the input/output operations on the peer storage processor are quiesced. At that time the prior packages installed on the peer storage processor are deactivated, and the new packages activated. The peer SP is then rebooted and the peer SP then takes control of the array.

After this occurs, the new software packages are then copied or installed onto the controlling SP and the input/output operations on the controlling SP are then quiesced. The prior software package on the controlling SP is deactivated and the new package activated.

The prior software packages on both storage processors are then uninstalled and a master software list on the storage array updated. The controlling SP is then rebooted and the array returned to normal operation with the new software package installed.

Since that time, in order to provide a better way of distributing upgrades, it has become desirable to migrate to a new packaging model where software packages include two components, one being the functional component of the software package, otherwise known as the capability package which is updated every time there is a new release, and an enabler package which is installed once and stays installed on the array for the purpose of indicating that the customer has purchased the particular software involved, and is entitled to use the optional feature that the package delivers.

In accordance with the invention, the old method of upgrading software packages on storage arrays is migrated to the new method and system for installing embedded software packages which consist of an enabler module embedded inside of a capability module, in a manner which is non-disruptive to the operation of the storage array while the upgrade is being installed.

BRIEF SUMMARY OF THE INVENTION

In accordance with one aspect, the invention involves a method of installing embedded software packages on one or more storage arrays on a network. The storage arrays are of the type having at least two storage processors controlling operation thereof. One storage processor is typically a controlling storage processor and the other is a peer storage processor.

The method involves transmitting a capability software package that has an enabler package embedded within it to at least one storage array on a network for installation thereon. After transmission a check is made to determine if an existing version of the capability package is installed. If the existing package is not installed, the transmitted package is installed according to a predetermined installation routine thereof.

It should be noted that by the term "version" is meant a release of software providing the same or similar functionality. A newer version is typically an upgrade or a "fix" to a prior version.

On the other hand, if the existing package is installed, a determination is made about whether the package is newer than software packages installed prior to a transition time, and which does not include the enabler package of the embedded software package to be installed. If the existing package is newer, the transmitted capability package is installed according to the predetermined installation routine thereof. If the existing package is a software package installed prior to the transition time, a determination is made about whether the enabler package is also being installed at the same time. If the enabler package is being installed, the transmitted package is installed according to the predetermined installation routine.

Alternatively, if the enabler package is not being installed, the transmitted embedded software is copied to an install location on the array, for example, to persistent storage, for installation. It is then determined if installation is to occur on the controlling storage processor. If it is not to be installed on the controlling storage processor, the transmitted embedded software package is then installed according to the predetermined installation routine, for example, on the peer processor. If it is to be installed on the controlling processor however, the enabler package is stored in persistent storage on the array, a master software list on the array is updated to list the enabler package, and the transmitted embedded software package is then installed on the controlling storage processor according to the predetermined installation routine.

In an alternative aspect, the invention relates to a system for installing embedded software packages on one or more storage arrays on a network. The storage arrays and network are of the type previously described, and the system includes means, including the software being configured, for performing the aforementioned steps of the method.

In yet still a further aspect, the invention relates to an improvement in a method of installing software packages on storage arrays on a network. The storage arrays are of the type previously described. The general method to which the invention is an improvement includes storing a software package persistently. The package is then installed on the peer processor. The peer processor is quiesced relative to input/output operations. The prior software package is then deactivated on the peer processor and the peer processor is then rebooted. The foregoing steps are then repeated for the controlling processor except for the rebooting operation. The prior software packages are then uninstalled for both the controlling and the peer processors. The master software list is updated and the controlling storage processor is then rebooted.

The improvement involves installing an embedded software package made up of an enabler package embedded inside of a capability package. The capability package is operating software for the array and the enabler package serves to indicate, once installed, that optional features are now available for use. By "optional feaures" is meant management software, layered drivers and like functionality. Thus, it is first determined if the prior package is an embedded software package comprised of the capability package and the enabler package. If it is not made up of the two packages, an installation of the embedded software package is conducted, including installing the capability package and the enabler package. A master software list is then updated on the array to show that the embedded software package has been installed.

BRIEF DESCRIPTION OF THE SEVERAL VIEWS OF THE DRAWING

Having briefly described the invention, the same will become better understood from the following detailed discussion thereof, presented herein with reference to the appended drawing wherein:

FIG. 3 is a table illustrating representatively how a master software list in accordance with the invention may be implemented;

DETAILED DESCRIPTION OF THE INVENTION

Figure 1:
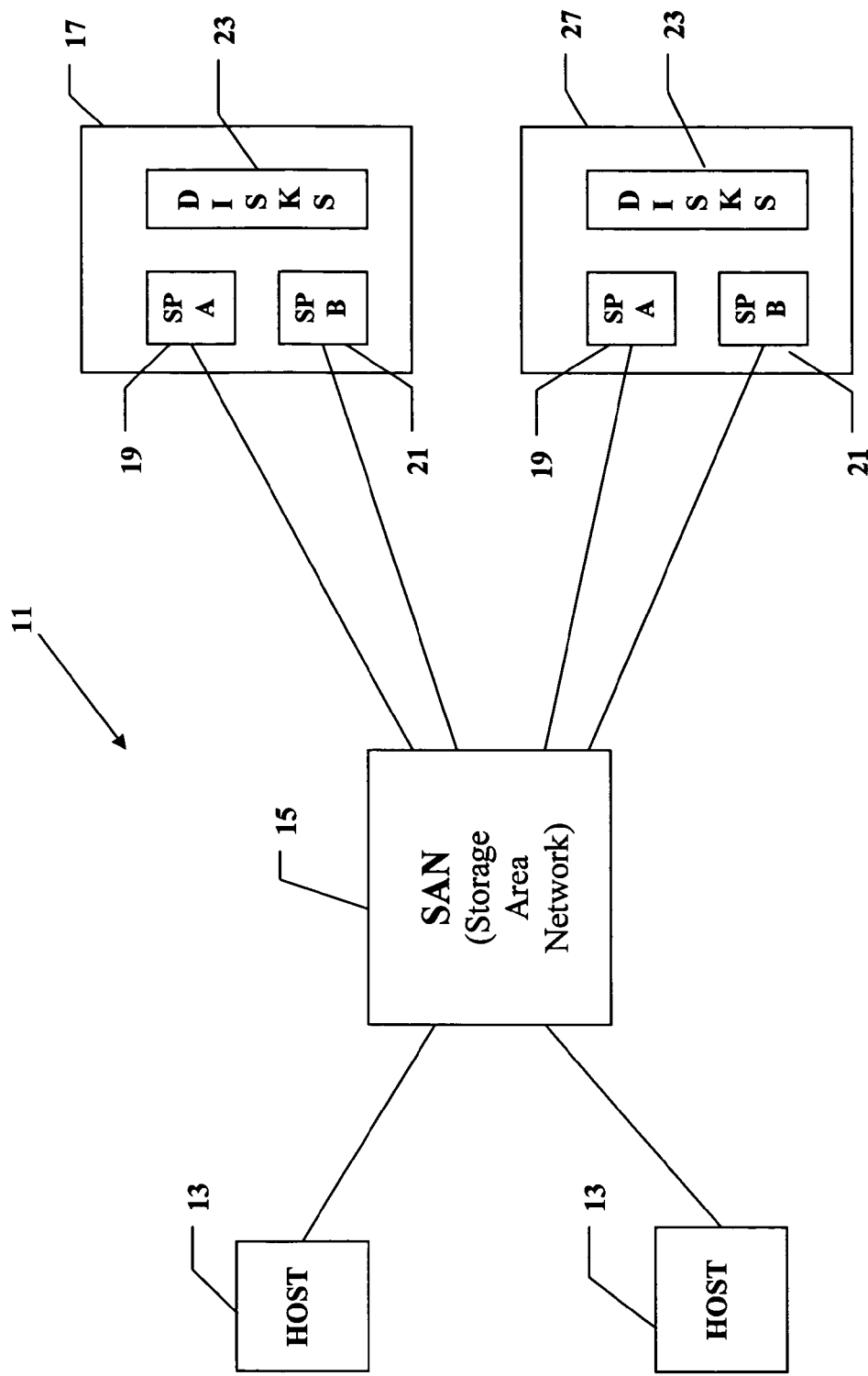
FIG. 1 is a block diagram showing a typical storage network configuration on which the invention is implemented.

FIG. 1 illustrates in block diagram form a general system 11 such as a storage network on which the invention described herein may be implemented. The storage network 11 typically includes hosts 13, for example, computers which are servers which include host bus adaptors (HBAs) connected through a SAN (storage area network) 15 which may consist of a number of fibre channels and switches which in various different configurations connect the various components of the network, including one or more storage arrays 17. The arrays 17 can be or example, those typically available commercially from EMC Corporation under the name CLARiiON®, and in particular, CLARiiON® systems identified by model numbers CX400 or CX600. Other like systems from other companies can of course also have the invention implemented thereon.

Each array 17 includes a number of hard drives 23 and storage processors 19 and 21, identified as SPA and SPB, which serve to control operation of the hard drives 23 and other components of the array 17, as well as providing communications to and from host 13.

Figure 2:
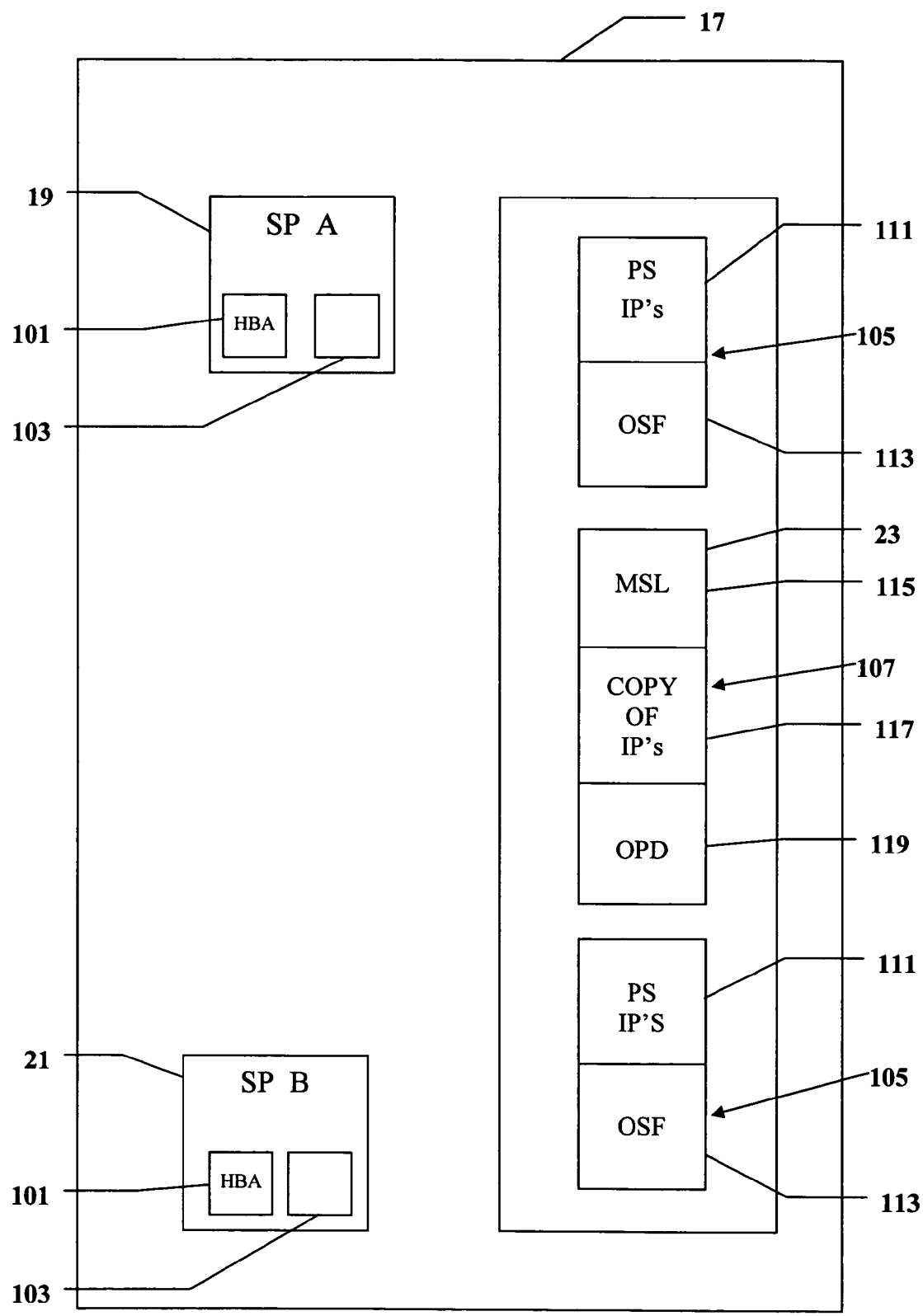
FIG. 2 is a block diagram showing in greater detail the configuration of a storage array of the type on which the invention is implemented.

FIG. 2 illustrates in greater detail a storage array of the type shown in FIG. 1. The storage array 17, typically a CLARiiON® system available from EMC Corporation, includes the two storage processors 19 and 21 identified as SPA and SPB. SPA and SPB include the controller chips from host bus adaptors (HBAs) 101, which are conventional in nature, and are the components of the storage processor which "talk" to the storage area network as well as serving to connect back to the hosts 13 and to the host bus adaptors on the hosts 13 as well. Each host bus adaptor 101 on the storage processor is connected to a section of memory on the storage processor known as cache 103. The operation of the disks 23 are typically controlled through the storage processors SPA and SPB as a result of instructions provided from the host server 13 and through software on the array 17, and implemented through the operation of SPA and SPB. The storage processors SPA and SPB run the algorithms which control how the various algorithms are laid out on the individual disks for redundancy purposes for error recovery. Such an arrangement is typically known as a RAID algorithm which refers to "redundant array of inexpensive disks", which make up the disks 23 of the array 17. Each array enclosure may contain up to fifteen disks and each array 17 may have multiple enclosures to provide more depth for more storage space.

The array of disks 23 provides a private storage space 105 for each storage processor SPA and SPB, individually. The private storage space 105 uses four disks, two for each SP, of the disks 23 on the array 17. The private storage (PS) space 105 is further subdivided into an installed software package (IP) space 111 which contains an installed software package and which is the software that allows running the storage array 17, and which is also the software that is upgraded intermittently over time to add new functionality or fix errors. The second part of the private space 105 is a portion 113 which contains other system files (OSF), including temporary files and operating system files which do not change over time and are not affected by upgrades, but are still on the array 17.

There is a third section 107 which also may span a number of disks which is known as persistent storage. Persistent storage is storage that is not specific to either storage processor 19 or 21. It is storage that if for some reason one storage processor had to be completely reimaged, contains all the data necessary to recover what was on the storage processor which is being reimaged. It is known as persistent because it is on one or more hard disks, and does not necessarily change when other data changes, or when a software package is installed. The section of the disks 23 that is identified as persistent storage is labeled 107, and is partitioned into three sections.

A first section 115 is known as a master software list (MSL) and lists all software packages which should have been installed or are installed on each of the storage processors. Section 117 contains copies of the software packages (IP)

which are used if the storage processors need to be recovered. Section 117 provides a backup copy which can be retrieved. Section 119 contains other persistent data (OPD) such as other system files. Thus, the persistent storage 107 may be used to reconstruct the private space 105 for one or both of the storage processors 19 or 21.

FIG. 3 is a table which illustrates an example of the information found in section 115, and which encompasses the master software list. As may be appreciated from a review of FIG. 3, each package has a name, i.e., A or B, which is a unique identifier. It also includes a version number such as 2.0, 2.3, 1.0 or 2.2, as illustrated therein. A further portion of the list indicates whether a particular version of a package is active or inactive as well as indicating what was running previously to provide historical information. Thus, the master software list shows both the current package as well as only the last installed version of the package. The prior version to the last installed version is always completely erased. Thus, the master software list will only have the current package listed and the prior to the current package listed. In this regard, it should be appreciated that the master software list describes what should be on the array at the time, but does not store the actual files for that package. In the example, package A may be the FLARE algorithm available from EMC Corporation for its CLARiiON® systems which controls the RAID. Package B may be other software functionality available for storage arrays of the type described herein.

In conducting the installation, it is typically initiated by a management station or a host 13 connected through a local area network (LAN) to an array 17 being upgraded. The management station or host 13 can initiate the install request, transmit the software package, and instruct the SPs on the array 17 to conduct the installation.

While described with references to operation on a network, it can also be implemented on a stand alone system with one computer connected directly to one array. The computer would then initiate directly, and not on a network. Other configurations may be implemented as will readily be apparent to those of ordinary skill in the art.

Figure 4A:
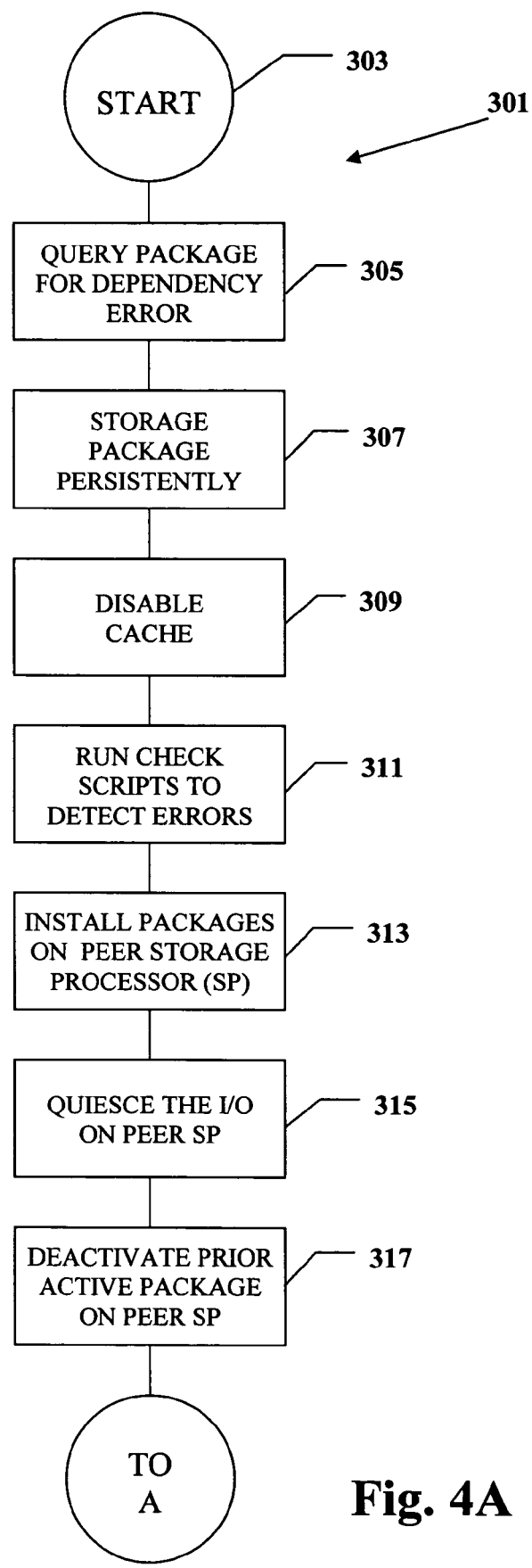
FIG. 4 is a block diagram illustrating an installation of software packages which may be modified by implementation of the invention as further illustrated in FIG. 5.
Figure 4B:
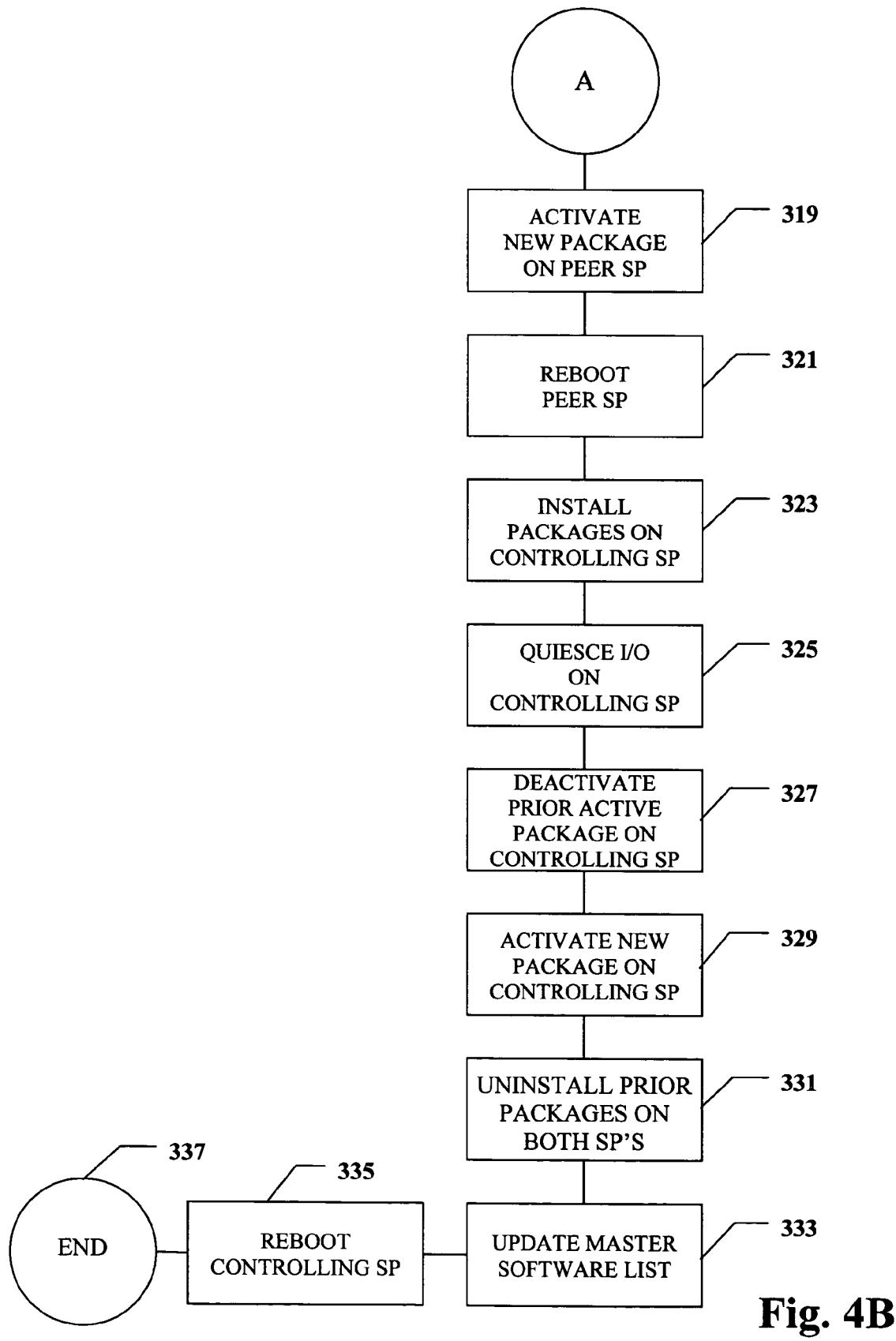

Turning now to FIG. 4, it is a block diagram 301 illustrating how software packages have been installed on storage arrays prior to the invention described herein. As already suggested, such software packages may be upgrades to the FLARE operating environment, and may add new layer drivers onto the system or upgrades to other functionally, new features and new functionality. Such installations may even encompass what is conventionally known as a "patch", and like software components.

In operation, the installation starts at 303. At step 305 the software package to be installed is queried for dependency errors. By dependency errors is meant errors in the package which were not known at the time the prior package was installed, but which have become known subsequent to the initial installation. More specifically, prior to installation, certain packages may have been tested and have been qualified to assure that they operate together, so the query may involve analyzing the packages that are to be installed, identifying what is on the array at the time and ensuring that the combination of packages is valid, has been tested together and is acceptable for installation by the user onto the array 17.

At step 307 the package is stored persistently into persistent storage region 111. Thereafter at step 309, cache 103 is disabled. More specifically, the cache 103 is disabled because eventually the storage processor associated therewith is to be rebooted. Thus, information on the cache would be lost anyway. As a result, the cache is disabled at step 309 for both storage processors SPA and SPB and the information is flushed out to the disks 23 so that no customer data will be lost whenever the storage processors SPA and SPB are rebooted. Thereafter, the cache 103 is not used during the installation process.

At step 311, additional scripts are run to detect errors. Such scripts are stored inside the packages and are software routines that describe error conditions when the software was running in the array. More specifically, this is a way of providing some redundancy for checks that were not made at step 305, and is a way of bootstrapping additional error checks to ensure there is no problem. Such scripts can be, for example, a .bat or .pl file which runs on the array 17 and which checks for various error conditions which are known at the time that the to be installed package was constructed, but which may not have been known when the array 17 was first shipped.

At step 313, the software package is installed on the peer storage processor, e.g. SPB under the control of the controlling processor, e.g., SPA.

The reason this is done one storage processor at a time is that it permits testing the operation of the installed package with one storage processor while maintaining the status quo on the controlling storage processor. More specifically, the controlling storage processor SPA copies the files out of the shared storage area, i.e., the persistent storage area 107, and installs them into the peer storage processor SPB. Thus, the controlling storage processor SPA tests to make sure that the installation occurred satisfactorily on the peer or controlled storage processor SPB. At step 315, input/output operations on the peer storage processor SPB are quiesced. While the new software package has been installed on the peer storage processor SPB, it hasn't actually been activated. Once input/output (I/O) is quiesced on the peer storage processor SPB, the controlling storage processor SPA is now the only storage processor handling I/O from the host.

At step 317 the prior active packages on the peer storage processor SPB are deactivated. The process then moves to circle A from FIG. 4A to FIG. 4B to step 319 where the new software package is activated on the peer storage processor SPB. Thereafter, at step 321, the peer storage processor SPB is rebooted to start running the new software package that was installed.

In other words, what has occurred is that the pointers are changed from the old packages to the new packages at step 319 to then go to step 321, where a reboot in a conventional manner is conducted with the peer storage processor SPB.

At this point, the peer storage processor SPB resumes processing I/O and at step 323 the packages are installed on the controlling storage processor SPA. At step 325, I/O is quiesced on the controlling storage processor SPA as before, and at step 327 the prior active package is deactivated on the controlling storage processor SPA. Thereafter, the new packages are activated on the controlling storage processor SPA at step 329.

At this point, the installation is different from that conducted on the peer storage processor SPB. More specifically, two additional steps are required. At step 331 the prior package is uninstalled on both storage processors. At step 333 the master software list at persistent storage 15 is updated to be followed by a rebooting of the controlling storage processor SPA at step 335, to then end the process at 337.

Figure 5:
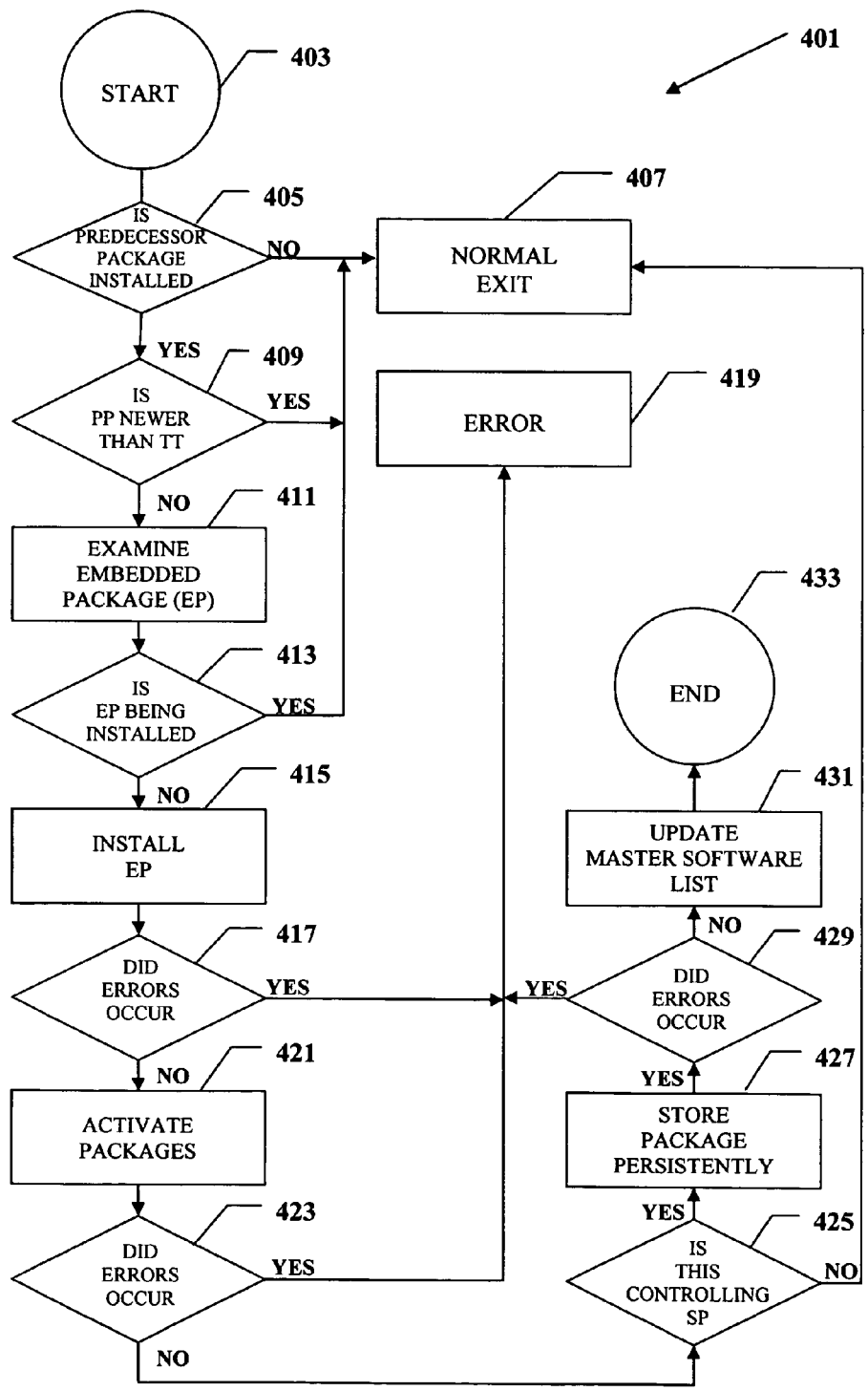
FIG. 5 is a flowchart illustrating the implementation of the installation of embedded software packages according to the invention, and done in a non-disruptive manner.

FIG. 5 is a flowchart 401 illustrating operation of the method 401 in accordance with the invention. It will be appreciated that implementation of the invention as illustrated in FIG. 5 occurs for the respective storage processors at corresponding steps 313 and 323 of FIG. 4 previously described.

More specifically, the installation of the software packages which include a capability package which is updated for each new release, and an enabler package embedded within, is installed once and stays on the array to indicate that the customer has purchased the software and entitled to use its features. At step 405 a query is made as to whether the predecessor package (PP) is installed. If the answer is "no", the processor proceeds to a normal exit 407 where control is returned to the script already in step 313 of FIG. 4. If the answer is "yes", at step 409 the system checks to see if the predecessor package is newer than a predetermined transition time (TT) and does not include the two packages, i.e., the capability package and the enabler package. More specifically, a check is made to determine if the predecessor package is of a type installed under the old software packaging model. If the answer is "yes" and it includes both embedded packages then the processor returns to the normal exit step 407. If the answer is "no", the system proceeds to step 411 where the embedded package is examined to obtain information about it such as its name and version number.

More specifically, at step 411 the embedded enabler package is unpacked for use in step 413. At step 413 the system determines whether the package already being installed is part of the entire upgrade operation. If the answer is "yes" the process proceeds to normal exit at step 407. If the answer is "no", at 415 the file is copied and installed onto the storage processor currently being operated on.

At step 417 a query is made as to whether any errors occurred. Some standard scripts are run which will detect any errors that occurred if they are known errors. If errors occurred, the system proceeds to error indication 419, and proceeds as if an error had occurred during step 313 or 323 of FIG. 4.

If the answer is "no", at step 421 the package is activated, and registry changes made for specific processor. At step 423 a query is again made about whether any errors occurred and if so, the system proceeds to step 419. If not, the system proceeds to a further query to determine whether deactivation is occurring on the controlling storage processor at step 425. If the answer is "no" the system then proceeds back to the normal exit 407 and back to the routine of FIG. 4.

If the answer is "yes", at step 427 the package is stored persistently for each one of the processors in its respective own private space 111. Thereafter, at step 429 a query is made as to whether an error occurred. If the answer is "yes" the system again proceeds to step 419 as before. If the answer is "no", then the master software list is updated at step 431 at section 15 of the disk area 23 of the storage array 17 and the process ends at step 433 and returns to the appropriate portion of FIG. 4 to continue installation without loss of functionality to the user.

Having thus described the invention in detail, it will be apparent to those of ordinary skill in the art that various alternatives and modifications can be made in a manner not affecting the scope thereof. Thus, the invention will become better understood from the appended claims in which it is set forth in the non-limiting manner.

What is claimed is:

1. A method of installing embedded software packages on storage arrays on a network, said storage arrays being of the type having at least two storage processors controlling operation thereof, one storage processor being a controlling storage processor and the other storage processor being a peer storage processor, the method comprising:
   a) transmitting an embedded software package comprised of a capability package and an enabler package embedded within the capability package to at least one storage array on a network for installation thereon;
   b) determining if an existing version of the capability package on the storage array is installed;
   c) if the existing version of the capability package is not installed, installing the transmitted embedded software package according to a predetermined installation routine thereof, said predetermined routine comprising:
      i) storing the embedded software package persistently,
      ii) installing the embedded software package on the peer storage processor,
      iii) quiescing I/O on the peer storage processor,
      iv) rebooting the peer storage processor,
      v) repeating steps (i) through (iii) for the controlling storage processor,
      vi) updating the master software list in persistent storage on the array, and
      vii) rebooting the controlling storage processor;
   d) if the existing version of the capability package is installed, determining if it is newer than software packages installed prior to a predetermined transition time, and does not include an enabler package;
   e) if the existing capability package is newer than a version of a software package installed prior to said transition time, installing the transmitted embedded package according to the predetermined installation routine;
   f) if the existing capability package is a software package installed prior to said transition time, determining if the enabler package is also being installed, and if the enabler package is being installed, installing the transmitted embedded software package according to the predetermined installation routine;
   g) if the enabler package is not being installed, copying the transmitted embedded software package to an install location on the array for installation thereon;
   h) determining if the installation of the embedded software package is to occur on the controlling storage processor;
   i) if the installation of the embedded software package is not to occur on the controlling storage processor, installing the transmitted embedded software package according to the predetermined installation routine; and
   j) if the installation of the embedded software package is to occur on the controlling storage processor, storing the enabler package on persistent storage in the array, updating a master software list on the array to list the enabler package, and installing the transmitted embedded software package in the controlling storage processor according to the predetermined installation routine.

2. The method of claim 1, wherein said enabler package functions to indicate that the array on which it is installed is entitled to use the software package's features, and does not change on later software package installations.

3. The method of claim 1, wherein said capability package comprises a functional change to the installed software package on the array.

4. The method of claim 1, wherein said master software list is updated to show only the installed embedded software package, and the software package prior to the current installed software package.

5. The method of claim 1, wherein said installation of the embedded software package is initiated by a management station or host on the network connected to the array having the installation conducted thereon.

6. A system for installing embedded software packages on storage arrays on a network, said storage arrays being of the type having at least two storage processors controlling operation thereof, one storage processor being a controlling storage processor and the other storage processor being a peer storage processor, the system comprising:

a controlling storage processor;

a peer storage processor;

means for transmitting an embedded software package comprised of an enabler package embedded inside of a capability package to at least one storage array on a network for installation thereon; and said embedded software package, when transmitted to said at least one storage array configured:
  a) for having a determination made of whether the existing software package on the storage array is installed;
  b) if the existing version of the capability package is not installed, having the transmitted package installed according to a predetermined installation routine thereof, said predetermined routine comprising:
    i) storing the embedded software package persistently,
    ii) installing the embedded software package on the peer storage processor,
    iii) quiescing I/O on the peer storage processor,
    iv) rebooting the peer storage processor,
    v) repeating steps (i) through (iii) for the controlling storage processor,
    vi) updating the master software list in persistent storage on the array, and
    vii) rebooting the controlling storage processor;
  c) if the existing version of the capability package is installed, for having a determination made of whether the existing version of the software package is newer than a software package installed prior to a predetermined transition time, and does not include an enabler package;
  d) if the existing capability software package is newer than the version of the software package installed prior to said transition time, for having the transmitted embedded software package installed according to the predetermined installation routine;
  e) if the enabler package is not being installed, for having the transmitted embedded software package copied to an install location for installation;
  f) for having a determination made as to whether the installation of the embedded software package is to occur on the controlling storage processor;
  g) if the installation is not to occur on the controlling storage processor, for having the transmitted embedded software package installed according to the predetermined installation routine; and
  h) if the installation is to occur on the controlling storage processor, for having the enabler package stored in persistent storage on the array, for having a master software list on the array updated to list the enabler package, and for having the transmitted embedded software package installed on the controlling storage processor according to the predetermined installation routine.

7. The method of claim 6, wherein said enabler package functions to indicate that the array on which it is installed is entitled to receive upgrade software packages, and does not change on later software package installations.

8. The method of claim 6, wherein said capability package comprises a functional change to the installed software package on the array.

9. The method of claim 6, wherein said master software list is updated to show only the installed embedded software package, and the software package prior to the current installed software package.

10. The system of claim 6, wherein an array to have the embedded software package installed thereon, is connected to a management station or host on the network which has the embedded software package stored thereon, and is configured for transmitting the embedded software package to the array with instructions to install the embedded software package thereon.

11. In a method of installing software packages on storage arrays on a network, said storage arrays of the type having at least two storage processors controlling operations thereof, one being a controlling storage processor and the other a peer storage processor, the method including storing a software package and uninstalling prior installed software packages on the controlling storage processor, the improvement comprising:
  (a) installing an embedded software package comprised of an enabler package inside of a capability package, said capability package being operating software for the array, and the enabler package serving to indicate that the array software is enabled;
  (b) determining if the prior software package is an embedded software package comprised of said capability package and enabler package;
  (c) if the prior software package is not an embedded software package, conducting an installation of the embedded software package, including installing the capability package and the enabler package, said installation being conducted an accordance with a predetermined installation routine comprising:
    i) storing the embedded package persistently,
    ii) installing the embedded software package on the peer storage processor,
    iii) quiescing I/O on the peer storage processor,
    iv) rebooting the peer storage processor,
    v) repeating steps (i) through (iii) for the controlling storage processor, and
    vi) rebooting the controlling storage processor; and
  (d) updating a master software list in persistent storage on the array to show that the embedded software package has been installed.

12. The method of claim 11, wherein said enabler package functions to indicate that the array on which it is installed is entitled to use the software package's features, and does not change on later software package installations.

13. The method of claim 11, wherein said capability package comprises a functional change to the installed software package on the array.

14. The method of claim 11, wherein said master software list is updated to show only the installed embedded software package, and the software package prior to the current installed software package.

15. The method of claim 11, wherein said installation of the embedded software package is initiated by a host on the network connected to the array having the installation conducted thereon.

* * * * *